Patented June 3, 1941

2,244,547

UNITED STATES PATENT OFFICE 2,244,547

PARASITICIDE

William P. ter Horst, Packanack Lake, N. J., assignor to United States Rubber Company, New York, N. Y., a corporation of New Jersey No Drawing. Application May 4, 1939, Serial No. 271,715

8 Claims. (Cl. 167—33)

This invention relates to improvements in parasiticide preparations.

It has been found that the reaction products of aliphatic ketones and ammonium thiocyanate possess valuable insecticidal and insect-repellent properties on a variety of insects and insect larvae. The compounds may be used not only as agricultural insecticides but also as household insecticides, particularly as mothproofing agents.

A preferred compound is the reaction product of methyl ethyl ketone and ammonium thiocyanate which is believed to have the following constitution:

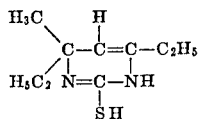

(6-methyl-4,6-diethyl-2-mercapto dihydropyrimidine)

The tautomeric form which is equivalent thereto is represented in the following formula:

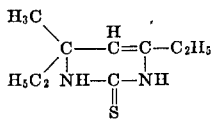

(6-methyl-4,6-diethyl-2-thio-tetrahydropyrimidine)

A manner of preparing the present chemicals is shown in U. S. Patent No. 2,131,790.

Similar products may be prepared from reacting ammonium thiocyanate with other ketones such as acetone, diacetone-alcohol, methyl-isopropyl ketone, methyl amyl ketone, and those ketones which are referred to as C-7 ketones and C-8 ketones which are made by the condensation of acetone and methyl-ethyl-ketone or of the condensation of methyl-ethyl-ketone with itself.

The invention is illustrated below using the reaction product of methyl ethyl ketone and ammonium thiocyanate.

Wool cloth was soaked in a solution of the reaction product of methyl ethyl ketone and ammonium thiocyanate in an appropriate solvent and allowed to dry. The cloth strips were then placed in cardboard boxes and five larvae of the black carpet beetle (Attagenus piceus) added to each box. The degree of feeding was noted weekly for three weeks. The results are tabulated below:

Five Colorado potato beetle larvae were placed on Irish potato foliage in Petri dishes which had previously been dusted with the chemical to be tested. In the control experiment, in which no insecticide was used, all five larvae were alive at the end of 48 hours, and approximately 50-70% of the foliage had been eaten. In the experiment in which the reaction product of methyl ethyl ketone and ammonium thiocyanate had been applied to the foliage, the larvae completely stopped feeding after 24 hours, and at the end of 48 hours the mortality was 40%.

A similar experiment carried out with the reaction product of methyl-amyl ketone and ammonium thiocyanate gave even better results. At the end of 24 hours, the mortality was 100%, and the amount of foliage eaten was negligible.

The reaction product of methyl ethyl ketone and ammonium thiocyanate was found to be effective also on Mexican bean beetle larvae and Southern army worm larvae.

The materials referred to above may be used in the form of sprays or dusts, alone or in combination with other insecticides or fungicides, or with inert materials, or with auxiliary ingredients such as wetting agents, sticking agents, spreading agents and the like.

For use as mothproofing agents, suitable solvents such as diacetone-alcohol, dioxan, glycerol dichlorhydrine, epichlorhydrine, o-dichlorbenzol, etc., may be used.

Having thus described my invention, what I claim and desire to protect by Letters Patent is:

1. An insecticide preparation containing as an active ingredient a product obtainable by the reaction of an aliphatic ketone and ammonium thiocyanate.

2. An insecticide preparation containing as an active ingredient a product obtainable by the reaction of a dialkyl ketone and ammonium thiocyanate.

3. An insecticide preparation containing as an active ingredient a product obtainable by the reaction of methyl ethyl ketone and ammonium thiocyanate.

4. An insecticide preparation containing as an active ingredient a trialkyl-substituted mercapto pyrimidine.

5. An insecticide preparation containing as an active incredient a 6-alkyl-4,6-dialkyl-2-mercapto dihydropyrimidine.

|  | End of 1st week | End of 2nd week | End of 3rd week |
|---|---|---|---|
| Untreated cloth | Heavy feeding | Heavy feeding | Heavy feeding. |
| Cloth treated with 1% solution of the reaction product of methyl ethyl ketone and ammonium thiocyanate in dioxan. | Very slight | Very slight | Very slight. |
| 1% solution of the reaction product of methyl ethyl ketone and ammonium thiocyanate in glycerol dichlorhydrine. | No feeding | No feeding | No feeding. |

Additional tests were made as follows:

6. An insecticide preparation containing as an active ingredient 6-methyl-4,6-diethyl-2-mercapto dihydropyrimidine.

7. An insecticide solution containing as an active ingredient a product obtainable by the reaction of a dialkyl ketone and ammonium thiocyanate.

8. An insecticide solution which may be used as a mothproofing agent containing as an active ingredient the reaction product of methyl ethyl ketone and ammonium thiocyanate.

WILLIAM P. ter HORST.